United States Patent

Tilton et al.

(10) Patent No.: US 6,827,894 B1
(45) Date of Patent: Dec. 7, 2004

(54) PROCESS FOR FORMING COMPOSITE INSULATOR

(75) Inventors: Jeffrey Allan Tilton, Louisville, KY (US); Cary E. Price, Louisville, KY (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 420 days.

(21) Appl. No.: 09/607,268

(22) Filed: Jun. 30, 2000

(51) Int. Cl.[7] .......................... B29C 43/20; B32B 31/18
(52) U.S. Cl. .................. 264/138; 264/258; 264/263; 264/266; 264/322; 264/324; 264/325; 264/327; 156/245
(58) Field of Search .................. 264/138, 258, 264/263, 266, 324, 325, 327, 322, DIG. 65; 156/245

(56) References Cited

U.S. PATENT DOCUMENTS

| | | | |
|---|---|---|---|
| 4,080,416 A | * 3/1978 | Howard | 264/258 |
| 4,131,664 A | * 12/1978 | Flowers et al. | 264/510 |
| 4,199,635 A | 4/1980 | Parker | |
| 4,373,001 A | 2/1983 | Smith et al. | |
| 4,418,031 A | * 11/1983 | Doerer et al. | 264/241 |
| 4,474,635 A | * 10/1984 | Adams | 156/245 |
| 4,770,919 A | 9/1988 | Tesch | |
| 5,366,678 A | * 11/1994 | Nomizo et al. | 264/112 |
| 5,436,046 A | 7/1995 | Sakamoto | |
| 5,529,742 A | * 6/1996 | Strapazzini | 264/511 |
| 5,591,289 A | * 1/1997 | Souders et al. | 156/148 |
| 5,614,285 A | * 3/1997 | Gardill | 428/156 |
| 5,660,908 A | 8/1997 | Kelman et al. | |
| 5,744,763 A | 4/1998 | Iwasa et al. | |
| 5,841,081 A | * 11/1998 | Thompson et al. | 181/286 |
| 5,923,002 A | * 7/1999 | McGrath et al. | 181/290 |
| 5,968,629 A | * 10/1999 | Masui et al. | 428/77 |
| 5,976,295 A | * 11/1999 | Ang | 156/219 |

FOREIGN PATENT DOCUMENTS

| | | |
|---|---|---|
| DE | 35 06 488 | 9/1986 |
| DE | 3621658 A1 * | 1/1988 |
| DE | 41 26 884 | 2/1993 |
| DE | 42 40 516 | 3/1994 |
| DE | 197 44 682 | 4/1998 |
| EP | 0 258 338 | 3/1988 |
| EP | 0 598 314 | 5/1994 |
| EP | 0 909 680 | 4/1999 |
| GB | 2 322 862 | 9/1998 |
| JP | 60 196332 | 2/1986 |
| JP | 09 001704 | 1/1997 |
| JP | 11 245320 | 12/1999 |

* cited by examiner

*Primary Examiner*—Stefan Staicovici
(74) *Attorney, Agent, or Firm*—Inger H. Eckert; Maria C. Gasaway

(57) ABSTRACT

A process for forming a multilayer composite insulator includes: (a) forming an insulator precursor by orienting an insulation insert in a desired location between a first facing layer of and a layer of a polymer based blanket material; (b) closing the insulator precursor in a molding press; (c) heating the insulator precursor in the molding press to a temperature sufficiently high to soften polymer binding fiber in the polymer based blanket material and cause reshaping; and (d) cooling the insulator precursor in the molding press so as to set the insulator precursor in its molded shape and complete formation of the insulator. Other relates processes are also disclosed.

9 Claims, 2 Drawing Sheets

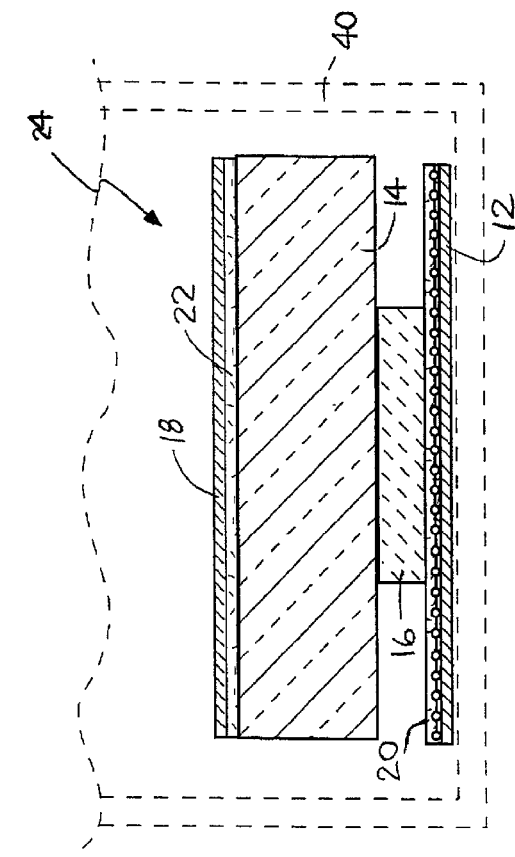
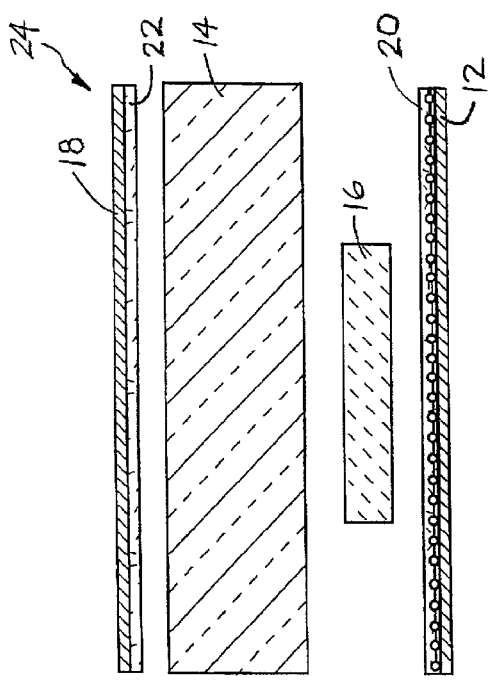
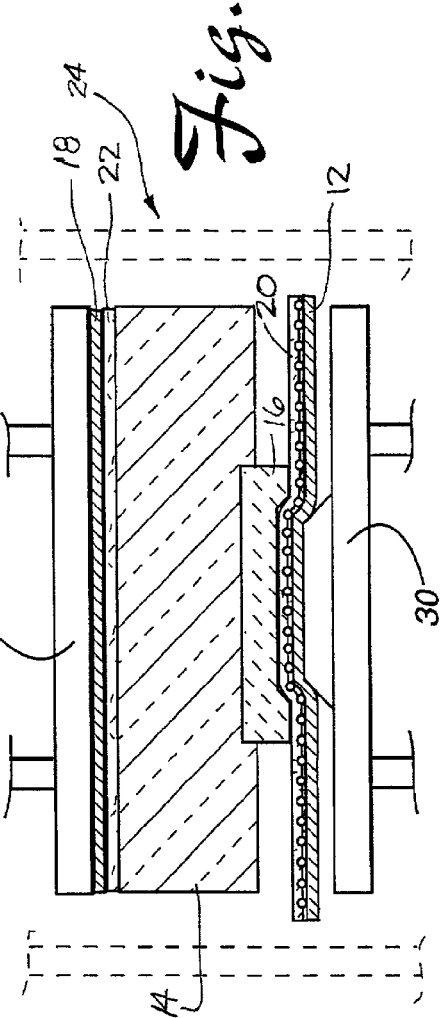

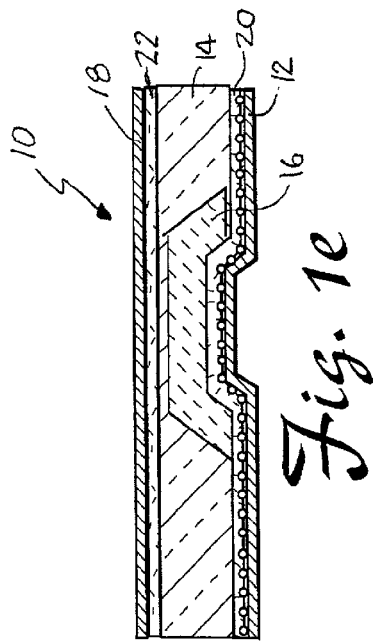
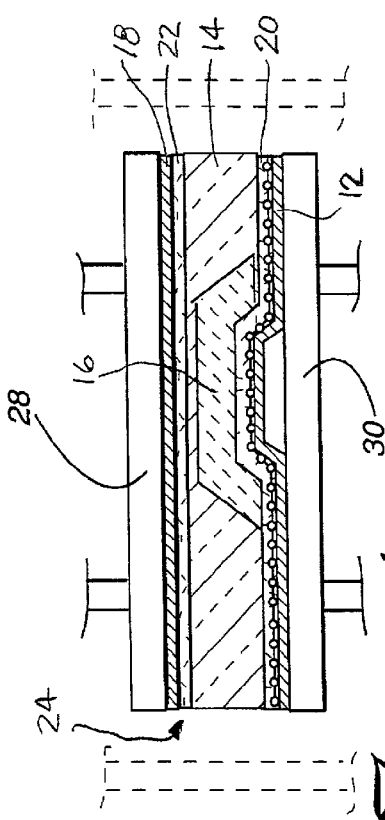
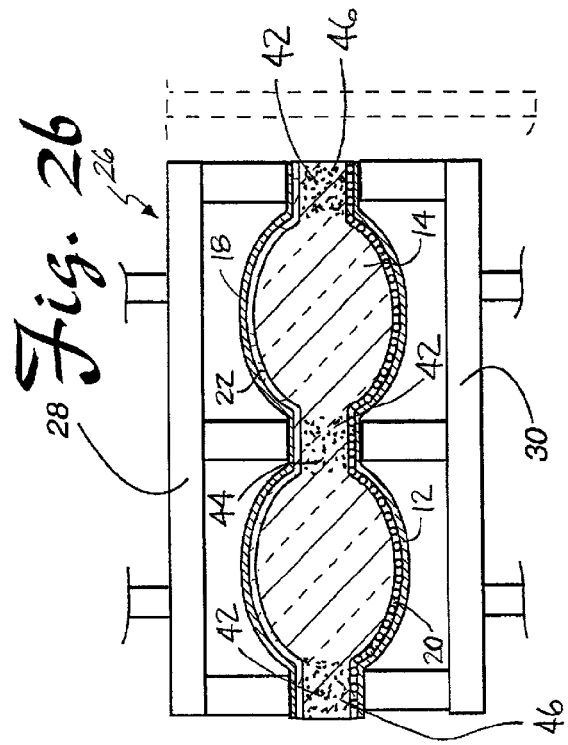
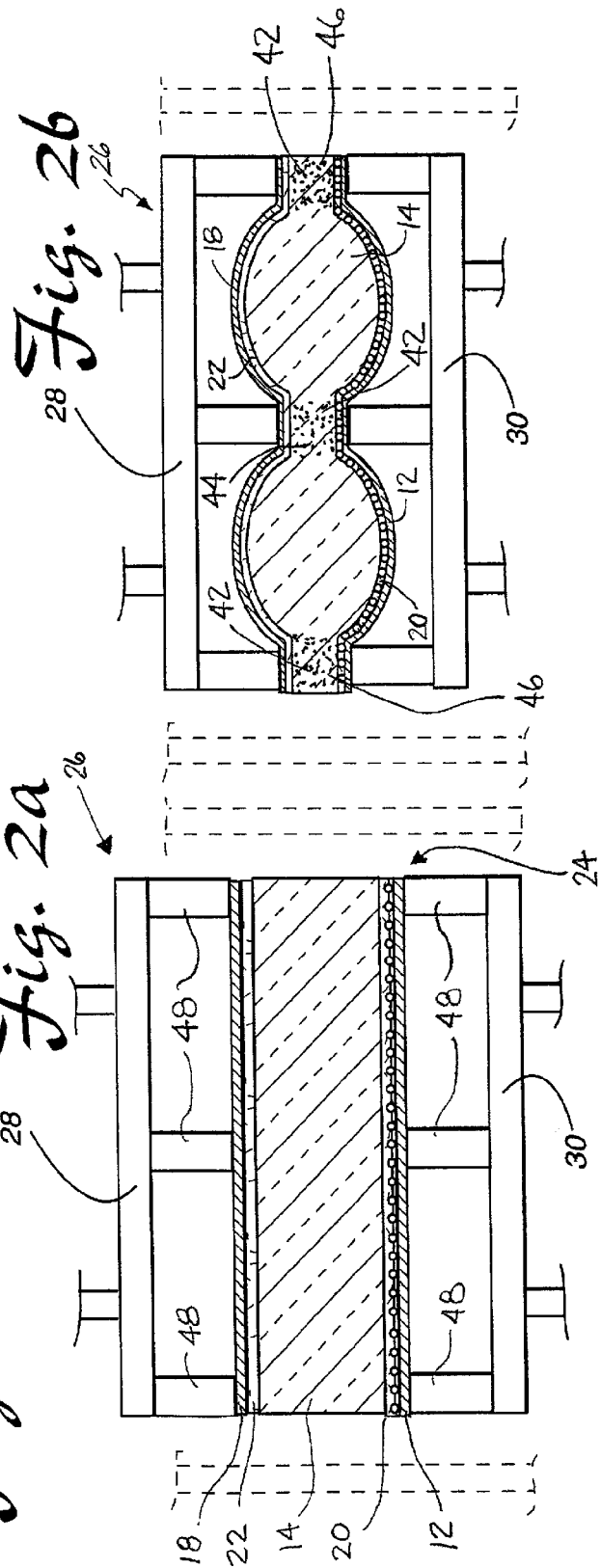

PROCESS FOR FORMING COMPOSITE INSULATOR

TECHNICAL FIELD AND INDUSTRIAL APPLICABILITY OF THE INVENTION

The present invention relates generally to a process for manufacturing a multilayer composite acoustical and thermal insulator which may be utilized to insulate an environment such as a passenger compartment of a vehicle from the heat and sound generated by mechanical components of that vehicle during its operation.

BACKGROUND OF THE INVENTION

It is well known in the art to provide acoustical and thermal insulators on an automobile, truck or other vehicle in an effort to protect and insulate the operating or passenger compartment from the noise and heat generated by the mechanical equipment of the associated vehicle. Toward this end, mats of high temperature glass fibers have been utilized, eg. (a) on the fire wall between the dashboard and engine compartment and (b) along the floor pan of the vehicle between the passenger compartment and the drive line and exhaust system. These materials provide heat insulation which makes it possible to maintain cooler and more comfortable temperatures in the operator/passenger compartment particularly during the summer months. Additionally, these materials provide needed sound insulation, reducing or eliminating various mechanical sounds of the motor, drive train as well as the suspension and tires as the vehicle travels over the often rough and bumpy surface of the roadway.

Various methods of manufacturing or fabricating such acoustical and thermal insulators are known in the art. Examples of these methods are found in, for example, U.S. Pat. No. 3,752,062 to Hubert et al. and U.S. Pat. No. 4,579,764 to Peoples, Jr. et al. In the Hubert et al. patent, thin, thermoplastic resin-coated sheets of fibrous materials are molded in a press by (1) heating the platens while the material is loaded therein, (2) compressing and molding the material and (3) cooling the platens to set the material in the desired shape prior to opening the platens and removing the part. In the Peoples, Jr. et al. patent, a carpet assembly is provided including a moldable thermoplastic polymer layer and a sound deadening foam cushion. The carpet assembly is preheated to temperatures sufficiently high to soften the thermoplastic layer. The preheated carpet assembly is then placed in cooperating mold dies and pressure is applied in order to mold the carpet assembly into the desired configuration. After sufficient cooling is provided to set the carpet assembly in the desire shape, the mold dies are opened and the molded carpet assembly is removed from the mold.

The Hubert et al. patent teaches that it is possible to mold thermoplastic resin coated sheets of fibrous material by heating and cooling those sheets during the time they are held in the mold. Thermoplastic resin-coated sheets of fibrous material are useful for certain applications but for most applications and particularly those relating to the insulation of automobiles, such sheets do not always provide the desired acoustical and thermal insulation properties. Multilayer composite insulators allow one to tailor the characteristics of the insulator to better meet the particular needs of an application. The Hubert et al. patent, however, fails to indicate that the hot/cold mold technique may be utilized to manufacture such multilayer composite insulators.

The Peoples, Jr. et al. patent teaches a transfer mold technique for the manufacturing of a carpet assembly including a thermoplastic polymer layer and a sound deadening foam cushion. There, however, is no indication in this reference that the transfer mold technique may be utilized in the manufacturing/fabricating of a multilayer composite insulator with enhanced acoustical and thermal insulating properties of the nature described below.

SUMMARY OF THE INVENTION

In accordance with the purposes of the present invention as described herein, an improved process is provided for forming a multilayer composite insulator. Such an insulator may be used for various applications in the acoustical and/or thermal insulation of vehicles, appliances such as dishwashers, clothes driers, refrigerators and freezers, as well as in the building industry. The process includes the steps of forming an insulator precursor by orienting an insulation insert in a desired location between a first facing layer and a layer of a polymer based blanket material enclosing the insulator precursor in a molding press. This is followed by the heating of the insulator precursor in the molding press to a temperature sufficiently high to soften polymer binding fiber in the polymer based blanket material and thereby causing reshaping/molding of the insulator precursor. Next is the cooling of the insulator precursor in the molding press so as to set the insulator precursor in its molded shape and complete formation of the insulator. This is then followed by the opening of the molding press and the removing of the insulator.

The insulator precursor may be formed in a continuous operation from continuous webs of facing layer (eg. heat reflective) material and polymer based blanket material. Alternatively, the process may include the step of cutting the first facing layer and the polymer based blanket material as well as the insulation insert to desired dimensions prior to forming.

More specifically describing the invention, the heating of the insulator precursor is typically completed to a temperature between approximately 200–400° F. and more typically to a temperature between 300–375° F.

During processing, the molding press is utilized to apply pressure to the insulator precursor at a level of between approximately 0.5–100.0 psi for approximately 10–90 seconds and more preferably 15–45 seconds dwell time. Further, the method includes the compressing of the insulator precursor between approximately 10–95% and more typically 50–90% when applying the pressure in order to complete the molding process.

Still further, the process may include the step of orienting an additional or second facing layer with the insulation insert, the first facing layer and the polymer based blanket material layer when forming the insulator precursor. In this approach, a four layer composite insulator results.

In accordance with yet another aspect of the present invention, the process for forming a multilayer composite insulator comprises the steps of forming an insulator precursor by orienting an insulation insert in a desired location between a first facing layer and a layer of a polymer based blanket material and preheating that insulator precursor to a temperature sufficiently high to soften the polymer binding fiber in the polymer based blanket material. This is followed by the transferring of the preheated insulator precursor to a molding press while the polymer binding fibers of the polymer based blanket material remain softened. Next is the closing of the insulator precursor in a molding press. This is followed by the cooling of the insulator precursor in the molding press so as to set the insulator precursor in its molded shape and complete formation of the insulator. Finally, the process includes the opening of the molding press and the removing of the insulator.

As noted above, the process just described may be completed as a continuous operation from continuous rolls of starting material or each of the materials may be cut to desired dimension prior to processing.

More specifically describing this process, the preheating of the insulator precursor is typically to a temperature between approximately 220–425° F. and more typically to a temperature between approximately 300–375° F. When closed in the press, the insulator precursor is subjected to the application of pressure at a level between approximately 0.5–100.0 psi for approximately 10–90 seconds of dwell time. This pressure results in the compressing of the insulator precursor between approximately 10–95%.

As with the first processing embodiment, the second processing embodiment may also include the step of orienting a second facing layer with the insulation insert, the first facing layer and polymer based blanket layer when forming the insulator precursor. This allows the production of a four layer insulator with virtually any facing desired.

In accordance with yet another aspect and embodiment of the present invention, the process for forming a multilayer composite insulator comprises the steps of forming an insulator precursor by orienting an insulation insert in a desired location between a first facing layer and polymer based blanket material layer and providing a selected area of the polymer based blanket material having added thickness. This is followed by the heating of the insulator precursor in the molding press to a temperature sufficiently high to soften polymer binding fiber only in the selected area of the polymer based blanket material. This is followed by the cooling of the insulator precursor in the molding press so as to set the insulator precursor in its molded shape and complete formation of the insulator. Following cooling is the opening of the molding press and the removing of the insulator.

As with the other embodiments of the present process described above, this third embodiment may be completed as a continuous molding operation from continuous rolls of starting material or the process may include the step of cutting the starting materials to desired dimensions prior to forming.

In accordance with the steps already described above, heating of the insulator precursor in this third embodiment is typically completed to a temperature between 200–400° F. and more typically between a temperature of approximately 300–375° F. The process also includes the applying of pressure to the insulator precursor in the molding press at a level of between approximately 0.5–100.0 psi for a substantially 10–90 seconds. This is done in order to provide compressing of the insulator precursor between approximately 10–95% during the molding operation.

As noted above with the other embodiments of the present process, the third embodiment may also include the orienting of a second facing layer with the insulation insert, the first facing layer and the polymer based blanket layer when forming the insulator precursor. As noted above, this allows the formation of a four layer composite with a facing layer added to provide desired mechanical, physical and/or aesthetic properties.

The third embodiment may be more broadly defined as a process of molding a panel from a polymer based blanket material. That process may be described as comprising the steps of providing the polymer based blanket material with at least one selected area having additional thickness and molding the polymer based blanket material into desired shaped wherein the at least one selected area is characterized by relatively high density and a relatively increased rigidity.

More specifically, the process includes the heating of the polymer based blanket material to a temperature sufficiently high to soften the polymer binding fiber in the polymer based blanket material and applying pressure sufficient to form the polymer based blanket material into a desired panel shape.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded s illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIGS. 1a–1e schematically illustrate the processes of the present invention; and FIGS. 2a–2b schematically illustrates in detail an alternative embodiment of the process of the present invention.

Reference will now be made in detail to the present preferred embodiment of the invention, an example of which is illustrated in the accompanying drawing.

DETAILED DESCRIPTION OF THE INVENTION

Reference is now made to FIGS. 1a and 1c–1e which schematically illustrate a first embodiment of the process of the present invention for forming a multilayer composite insulator generally designated by reference numeral 10. As shown in FIG. 1e, the multilayer composite insulator 10 includes a first facing layer 12, a polymer based blanket layer 14, an optional insulation insert 16 and an optional second facing layer 18.

The first facing layer 12 may be made from polyester, polypropylene, rayon, nylon glass and any combination thereof. In applications requiring superior heat insulative characteristics, the facing layer 12 may be formed from a heat reflective material such as a metallic foil (eg. aluminum or other heat reflective metal). Where a metallic foil is used foil thickness is generally in the range of 0.5–5.0 mil. In most applications, a foil thickness of between substantially 0.5–2.0 mil (e.g. 1.0 mil) is used. The thickness selected is based upon the temperature, durability and structural requirements of the particular product application.

The first facing layer 12 may be reinforced or non-reinforced. Reinforcements are included to add durability and structural integrity. Reinforcements may take the form of fibrous scrims, fibrous mats or fibrous webs. For many applications, the reinforcement is made from a relatively strong fiber such as fiberglass. Typically, glass fiber threads are arranged in a criss-cross pattern. The number of threads per inch can be adjusted to provide the desired product properties. The fiber reinforcement strands are regularly spaced across the web and cross-web directions of the foil. Typically, spacing patterns include but are not limited to 4×4 (four strands per inch in both directions), 3×3, 2×2, 4×2 and 3×2. Typical patterns are rectangular and diamond. The strands may be materials other than glass which provide the desired properties (e.g. polyester).

Alternative reinforcement materials for the foil layer 12 include but are not limited to glass mats, polymer mats and blended mats. The reinforcement may be preattached to the metallic foil. Alternatively loose laid reinforcement may be utilized. In most applications, the foil layer reinforcement provides improved tear resistance, strength and/or acoustical insulating properties. However, in many applications, it should be appreciated that no reinforcement is necessary.

The first facing layer 12 (reinforced or non-reinforced) is attached to the polymer based blanket layer 14 and/or the insulation insert 16 by means of a heat activated adhesive 20. The adhesive 20 utilized may be a thermoplastic sheet or thermoplastic web material that tends to melt and flow at temperatures between 200–350° F. Adhesives 20 of this type are desirable because they can be activated during the molding phase of production. Besides thermoplastic sheets and webs, adhesives 20 such as hot melts, latex and various heat activated resins may be utilized. The adhesive 20 may be a separate layer as illustrated or the adhesive may already be attached to the first facing layer 12 in a dot matrix (i.e. uniform) or sintered (i.e. random) pattern or even a continuous film.

The polymer based blanket layer 14 must exhibit the thermal and acoustical properties necessary for the finished product to perform to the requirements of its particular application. Generally, the polymer based blanket layer 14 is made from polyester fiber mat or a polyester fiber mat blend. Other materials that my be utilized include mats of polyolefins, polyethylene, cotton shoddy, nylon, rayon, acrylic natural fibers (eg. kenaf, hemp) and combination thereof with or without melt blown microfibers. Such mats generally have a density of between 25–200 $g/ft^2$ and more typically 50–150 $g/ft^2$ and still more typically 75–125 $g/ft^2$.

The insulation insert 16 is provided to furnish extra thermal and/or acoustical insulation over sources of high heat and/or high sound commonly associated with various operating systems of the vehicle. Materials that my be used for the insert 16 include but are not limited to fiberglass, high temperature foams, polymer based blanket products and natural fiber based blanket products. In order to reduce the thickness or bulk of the insulator 10, increase its flexibility for ease of installation and also lower production costs, the insert 16 is sized and positioned in the insulator at one or more selected locations only in order to provide shielding of (a) heat sources which produce hot spots requiring extra thermal protection and/or (b) sound transmitting or generating components that are sources of strong sounds which might otherwise annoy the operator and passengers of the vehicle.

For many applications, strong thermal insulating properties are an essential characteristic of the insert 16. For these applications, the material utilized for the insert 16 must not produce smoke when exposed to temperatures as high as 450° F. Materials such as fiberglass and some higher temperature foams are ideal for such an application. Layered composite materials may also be utilized. Even a secondary layer of foil or like heat reflective material may be utilized as long as the material is capable of dissipating heat and/or acoustical energy from localized areas in the insulator 10.

Second facing layer 18 provides a smooth durable surface for mounting the insulator 10 against a vehicle component such as a fire wall, fender well, drive shaft tunnel or passenger compartment floor pan. A number of readily available materials may be utilized to construct the second facing 18. Such materials include polyester, polypropylene, rayon, nylon, glass, metal foil and any combinations thereof (eg. polyester/rayon). Both the first and second facing layers 12, 18 may also be treated to provide enhancement of desirable properties. Accordingly, the facing layers 12, 18 may be chemically treated, for example, with moisture barriers, flame retardants, biocides and colorants (eg. dark gray or black). The second facing layer 18 may have a weight of 0.25 to 3.0 $oz/yd^2$ (eg. 1.25 $oz/yd^2$).

FIG. 1a shows the forming of an insulator precursor 24. This is accomplished d by orienting an insulation insert 16 at a desired location between a first facing layer 12 and a layer of the polymer based blanket material 14. While not required in the final product, FIG. 1a also shows a second facing layer 18 including its adhesive layer 22. While FIG. 1a shows the first facing layer 12, polymer based blanket layer 14, insulation insert 16 and facing layer 18 all being cut to desired dimensions prior to forming, it should also be appreciated that the present process may be continuous with the starting materials each being fed in desired lengths from a continuous roll or supply of starting material into the molding equipment.

Altogether, the first facing layer 12, polymer based blanket layer 14, insulation insert 16 and second facing layer 18 form an insulator precursor 24. As shown in FIG. 1c, the insulator precursor 24 is fed or placed into a molding press generally designated by reference numeral 26. The molding press 26 includes a first molding element 28 and a second, cooperating molding element 30. As illustrated, the molding elements 28, 30 take the form of platens. In accordance with the present process, the platens 28, 30 of the molding process 26 are closed around the insulator precursor 24.

Upon closing, the first and second molding elements or platens 28, are heated to provide a temperature sufficiently high to soften the polymer binding fiber of the polymer based blanket material 14.

The closing of the molding press 26 on the insulator precursor 24 also applies pressure to two opposing sides of the insulator precursor 24. The pressure is typically applied at a level between substantially 0.5–100.0 psi for approximately 5–45 seconds and more typically 5–20 seconds. The pressure over the entire surface of the insulator precursor 24 varies significantly due to the shape of the platens 28, 30 and the varying thickness of the precursor. As a result, the insulator precursor 24 is compressed between approximately 50–90% and more typically between 75–90%. The molding press 26 may be set up with electric heating elements, hot oil circulation, or other hot fluid circulation in order to quickly heat the platens 28, 30 and therefore the insulator precursor 24 to the desired temperature.

Together, the applied heating and pressure result in the molding of the insulator precursor 24 into a desired shape. This is followed by the cooling of the insulator precursor 24 to set the precursor in the molded shape and complete the formation of the insulator 10. The desired cooling may be achieved, for example, by circulating cooling fluid through the platens 28, 30. After opening the mold press 26, the formed and set insulator 10 may be.

The process shown in FIGS. 1a and 1c–1e and described above advantageously produces high density boards, panels or contour shaped parts/insulators 10 exhibiting uncompromisingly smooth surfaces. Superior surface quality and dimensional control are possible since both the heating and cooling steps occur in the molding press 26.

Viewed together, FIGS. 1a–1e demonstrate an alternative process very similar to that described above. In this process, the insulator precursor 24 is again formed from first facing layer 12, a polymer based blanket layer 14, an insulation insert 16 and an optional second facing layer 18. These starting materials may be fed from continuous rolls of materials or cut into desired dimensions prior to processing. As shown, the insulation insert 16 is positioned between the polymer based blanket layer 14 and the first facing layer 12. It should be appreciated, however, that the insulation insert 16 could be positioned fully within the polymer based blanket layer 14, if desired.

After forming the precursor 24, next is the preheating of the insulator precursor 24 to a temperature sufficiently high to soften the polymer binding fiber in the polymer based blanket material. Preheating is typically to a temperature of approximately 220–425° F. and more typically to a temperature of approximately 300–375° F. Preheating may be completed in a forced air oven such as shown at 40 in FIG. 1b or by means of a heated press, heated skid plate(s), heater roller(s) or the like.

After preheating, the insulator precursor 24 is quickly transferred to the molding press 26 in order to prevent the polymer fiber binding material in the layer 14 from cooling below its softening temperature prior to molding. This may be accomplished, for example, by utilizing a continuous belt conveyor for transporting the insulator precursor 24 from the preheating oven 40 to the molding press 26. Of course, any alternative method may be used so long as the transfer is completed swiftly enough to meet the requirements of the process.

In order to extend the time frame for transfer, transfer insulators (not shown) may be utilized on the top and/or bottom of the insulator precursor 24 during transfer. Such transfer insulators may be formed from any material that would slow the cooling of the insulator precursor 24 and particularly the polymer fiber in the layer 14. Such materials include fiberglass, cardboard, hardboard, metal, wood, etc.

The transfer insulators may either be removed prior to positioning of the insulator precursor 24 in the molding press or the transfer insulators may remain with the insulator precursor 24 during the cold molding process.

Another method to extend the molding window of the insulator precursor 24 is to direct a stream of heated air over the surfaces of the insulator precursor during transfer. If the transfer is not made quickly enough and the insulator precursor 24 and particularly the polymer fibers of the layer 14 cool below their softening temperature before molding, the resulting molded insulator will suffer from poor surface quality and/or dimensional characteristics.

Following transfer to the molding press 26, the insulator precursor 24 is subjected to cold molding. Specifically, the platens 28, 30 of the press are closed on the insulator precursor 24 in order to provide a pressure of about 0.5–100.0 psi for between 5–45 seconds thereby compressing the precursor between approximately 50–95%. Upon cooling, the insulator precursor 24 sets in its desired final shape. By opening the platens 28, 30 of the molding process 26, it may then be removed and the molding press readied to process the next precursor.

In order to insure quick and efficient cooling, both of the platens 28, may be ran cooler than the softening point of the polymer binding fiber in the polymer-based blanket material 14. Typically, the platens 28, 30 are running at or below room temperature (eg. 50° F. or lower). Generally, the lower the temperature of the platens 28, 30, the faster the insulator precursor 24 cools below the polymer binding fiber softening temperature and the shorter the overall molding cycle. The platens 28, 30 do not need to be running the same temperature and in some cases may be deliberately set with one platen running significantly cooler than the other.

Yet another embodiment of the present process is shown with reference to FIGS. 1a–1e and 2a–2b. In this embodiment, the insulator precursor 24 is formed from an optional first facing layer 12, a polymer based blanket layer 14, an optional insulation insert 16 and an optional second facing layer 18. In this embodiment, the polymer based blanket layer 14 is provided with one or more selected areas 42 characterized by relatively high density and increased rigidity in order to add strength to the product. Typically the high density areas 42 are provided as ribs 44 along the intermediate portion of the insulator 10 and/or edges 46 along the margins of the insulator (see FIG. 2b). This is accomplished by providing the platens 28, 30 with opposed cooperating projections 48 which apply increased pressure and produced greater compression of the polymer based blanket layer 14 in the selected areas 42 (see FIG. 2a). Specifically, the polymer based blanket layer 14 is crimped in the selected areas 42 between the projections 48. The increased pressure and resulting greater compression results in rapid heat transfer to the polymer binding fiber in the selected areas 42. Thus, the fibers in the selected areas 42 quickly soften and are rapidly molded into high density zones.

Processing is completed essentially in the manner previously described. The insulator precursor 24 with the selected areas 42 is positioned in the molding press 26. There the insulator precursor 24 is heated and compressed 50–95% by application of appropriate pressure in the selected areas 42.

In order to achieve the desired result, the process is completed quickly. Accordingly, the pressure is applied for only approximately 5–45 seconds and more typically 5–20 seconds. While substantially uniform heating temperature and pressure are applied across the selected areas 42 of the insulator precursor 24 to provide the desired crimping and densifying action with respect to the polymer based blanket layer 14, the molding press 26 may or may not have both platens 28, 30 running at the same temperature. Some applications will be more efficiently completed with one platen running at a 25–75% lower temperature than the other platen. If both platens are run the same they would typically run in the range of approximately 275–400° F. If a differential temperature is set between the two platens, then one platen may, for example, run at 350° F. while the other runs at 150° F.

Following molding, the platens 28, 30 are opened and the insulator is removed. The selected areas 42 remain crimped without any special cooling.

As noted above, the resulting ribs and/or edges are characterized by a relative increase in material density and overall rigidity. An insulator 10 formed with ribs and/or edges as described has many applications in the automotive, appliance and commercial interior markets where there is a desire to seal the edge of the insulator or fit the edges into grooved/slotted frames or fixtures.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, a full size insulation insert 16 could be utilized running substantially from edge-to-edge across and along the insulator could be provided. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A process for forming a multilayer composite insulator, comprising:

forming an insulator precursor by orienting an insulation insert in a desired location between a first facing layer and a layer of polymer based blanket material;

closing said insulator precursor in a molding press and crimping at least one selected area of said insulator precursor;

heating said insulator precursor in said molding press to a temperature sufficiently high to soften only said polymer binding fiber in said at least one selected area of said layer of polymer based blanket material; and opening said molding press and removing said insulator wherein said insulator includes said at least one selected area characterized by relatively high density and relatively increased rigidity.

2. The process of claim 1 further including cutting said first facing layer, said layer of polymer based blanket material and said insulation insert to desired dimensions prior to forming.

3. The process of claim 1 wherein said heating of said insulator precursor is to between 200–400° F.

4. The process of claim 1 wherein said heating of said insulator precursor is to between 300–375° F.

5. The process of claim 1, including applying pressure to said insulator precursor in said molding press at a level between approximately 0.5–100.0 psi.

6. The process of claim 5 wherein said pressure is applied for between substantially 5–45 seconds.

7. The process of claim 5 including compressing said insulator precursor between approximately 10–95% when applying pressure.

8. The process of claim 1, including orienting a second facing layer with said insulation insert, said first facing layer and said layer of polymer based blanket material when forming said insulator precursor.

9. A process for forming a multilayer composite insulator, comprising:

forming an insulator precursor by orienting an insulation insert in a desired location between a first facing layer and a layer of a polymer based blanket material including polymer binding fibers; and molding said insulator precursor into a desired shape by;

heating said insulator precursor;

applying pressure to said insulator precursor;

softening only those polymer binding fibers present in at least one selected area of said polymer based blanket material; and crimping said at least one selected area.

* * * * *